March 3, 1959 E. A. MEYER 2,875,493
CLIP ASSEMBLY
Filed Nov. 23, 1954

INVENTOR
Engelbert A. Meyer
BY S.C. Thorpe
ATTORNEY

United States Patent Office 2,875,493
Patented Mar. 3, 1959

2,875,493

CLIP ASSEMBLY

Engelbert A. Meyer, Detroit, Mich., assignor to General Motors Corporation, Detroit, Mich., a corporation of Delaware Application November 23, 1954, Serial No. 470,599

1 Claim. (Cl. 24—213)

This invention relates to a spring clip retaining device for securing bead trim or a decorative member to an apertured support such as automobile bodies and the like. In automobile body construction the decorative bead trim or molding is often inadvertently removed or is allowed to move in one or more directions causing an undesirable vibration or rattle of the trim member due to inherent defects of the spring clip retaining device which secures the trim to the body.

The principal object of the present invention is to provide a spring clip having a head portion which when the clip is in position to secure the trim member to the support lies between the inturned flanges of the trim member in such a manner as to resiliently prevent the trim member from becoming dislodged, loosened or moved with respect to the supporting member.

Another object of the invention is to provide improved clip constructions of the type mentioned having novel, resilient, molding-engaging means so that a resilient anti-rattling and retaining pressure is exerted on the molding at all times while rigid shoulders prevent any transverse movement of the molding.

A further object of the invention is to provide an improved clip construction of the type mentioned having resilient, novel, molding-engaging means whereby the molding may be "hooked" over one end of the clip and snapped into place over the opposite end thereof.

For a fuller understanding of this invention and the objects thereof, reference may be made to the accompanying detailed descriptions and drawing, in which.

Figure 1:
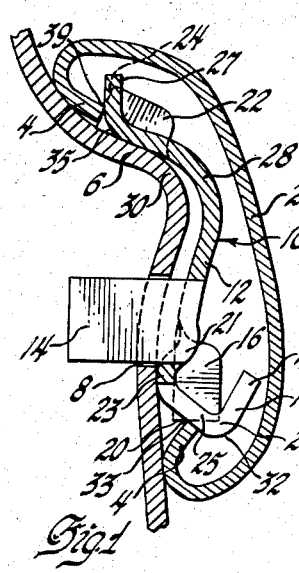
Fig. 1 is a fragmentary vertical cross sectional view taken on line 1—1 of Fig. 3 illustrating a molding secured to a supporting panel by means of a clip embodying the features of the present invention.

Referring to the drawing and particularly to Fig. 1, a sheet metal channel-shaped molding strip or bead trim member 2 having inturned edges or flanges 4 is shown. It should be appreciated, of course, that the strip 2 is elongated in shape and is adapted to be attached to a sheet metal panel 6 such as one of the body panels of an automobile at spaced intervals along its length. The panel 6 is provided with a plurality of spaced substantially rectangular openings or apertures 8 (whose ends 9 in the embodiment shown are semicircular, see Fig. 3) along the line which the molding strip 2 occupies when in position. Each of the clips forming the subject matter of the present invention is preferably formed of a single integral sheet metal stamping blanked from relatively high carbon steel which after being formed with fingers, projections, tabs and prongs all in proper relation, configuration, etc., is heat treated or otherwise tempered in order to give it the resiliency and ruggedness deemed necessary in a clip of the type herein described.

Figure 2:
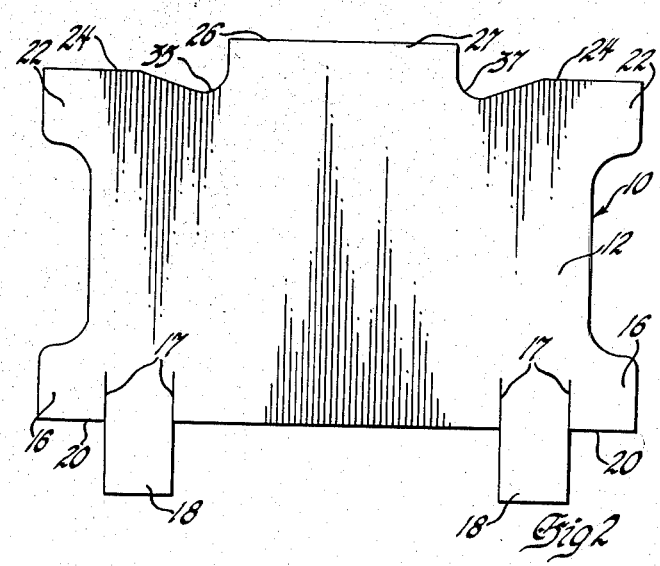
Fig. 2 is a plan view of the flat metallic blank before bending.
Figure 3:
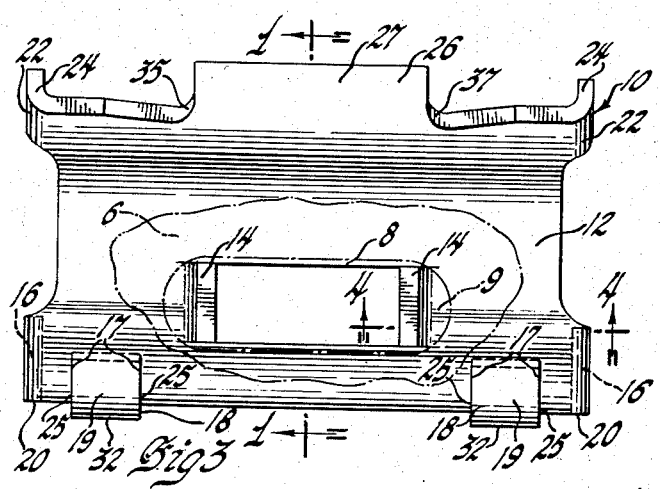
Fig. 3 is a view similar to Fig. 2 except that the blank has been lanced and various tabs have been uniquely bent into place to form the novel clip.
Figure 4:
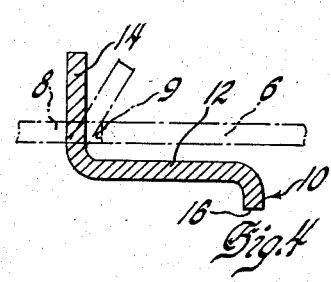
Fig. 4 is a view taken on the line 4—4 of Fig. 3 illustrating the manner in which the clip is secured to the panel.
Figure 5:
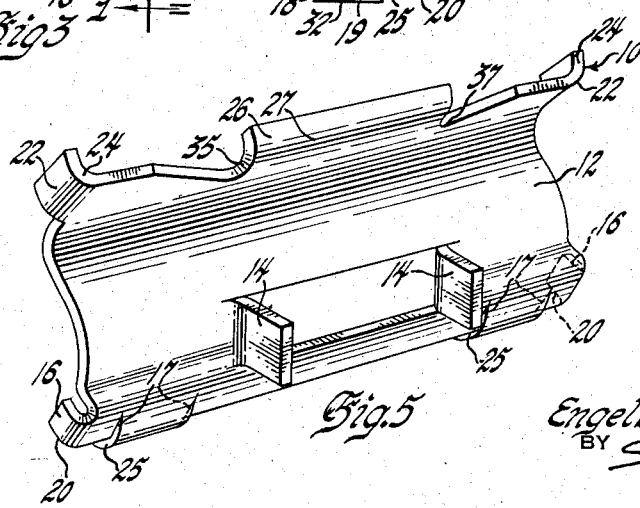
Fig. 5 is a view in perspective of the completely formed clip.

The molding 2 is securely mounted to the panel 6 by means of the novel clips generally indicated by 10 which engage the molding 2. Each clip 10 is made from a blank as seen in Fig. 2 and comprises a plate-like portion 12 which is of greater area than the area of aperture 8 so that the portion 12 extends beyond the confines of aperture 8 and serves to some extent as a cover therefor. In order to secure the clip 10 to the panel 6 the center of plate-like portion 12 is lanched and bent so as to form two projections 14 extending normal to the plate-like portion 12 and through the aperture 8, as best seen in Figs. 3 and 4. A suitable tool may be inserted through the aperture between the projections 14 to spread the projections 14 apart thereby "hooking" or locking them behind the panel 6 and anchoring the clip firmly in place on the panel.

In addition to the center plate-like portion 12 the clip 10 is provided in the corners at one end thereof with a pair of oppositely disposed laterally extending ears or tabs 16 and also a pair of ears or tabs 18, the tabs or ears 18 projecting beyond one end of the main portion of the clip 10. The tabs 16 are bent normal to the main portion 12 so as to provide relatively rigid shoulders 20 facing away from one end of the clip and resistive to forces exerted against the clip toward the one end thereof. The edges of the tabs 18 are extended by lancing as at 17 into the main portion 12 and the tabs 18 are turned or bent, as best shown in Fig. 1, so as to form a pair of transversely spaced spring detents which for the purpose of distinguishing from the unformed tabs 18 will be called 19. The detents 19 have a first bend 21 of approximately 45° out of the plane of the lower part of the main portion 12 toward the side of the main portion 12 from which projections 14 extend. A second approximately 90° bend 23 which is spaced from and reversed with respect to bend 21 causes the edges 25 formed by lancing at 17 and defining the bends 21 and 23 to form an angle 33 of between 90 and 180 degrees with the edges defining the shoulders 20 (see Fig. 1). A third bend 29 also about 90° forms a convex cam surface 32 spaced from bend 23 and located slightly beyond shoulders 20.

Located in the opposite corners of the substantially rectangular spring portion 12 of the clip are a pair of oppositely disposed laterally extending ears or tabs 22 which are bent normal to the portion 12 so that they extend in the same general direction as the tabs or ears 16. The tabs 22 also form relatively rigid shoulders 24 facing away from the other end of the clip which serve to resist any forces applied thereto toward the other end of the clip 10. Intermediate the tabs 22 on the same end of the clip is one relatively large tab 26 which is bent up to be on the same side of portion 12 as shoulders 24 so as to form a semiresilient spring detent which will be identified in the specification by the numeral 27. Detent 27, because of the cut-backs at 35, 37 and the manner in which it is bent, forms or subtends an angle 39 of between 90 and 180 degrees with the edges forming shoulders 24 (see Fig. 1). The angle 39 appears as a V-shaped groove or trough in Fig. 1. The semiresilient spring detent 27 due to its shorter length and width is much stiffer than the resilient spring detents 19 and, as will be appreciated later in the specification, primarily performs an anchoring function for one inturned flange of the molding 2. In addition to properly bending the various ears or tabs of the clip the main portion of the clip is bent so as to give it a configuration which in section appears as shown in Fig. 1. In the cross section shown it will be observed that the clip is provided with a ridge or hump 28 which substantially conforms with a ridge 30 provided in the panel 6 and divides portion 12 into two portions forming an angle of between 90° and 180°. While the particular clip is adapted for fastening over a ridge such as that shown at 30 in the panel 6 it should be appreciated that the clip is equally effective for flat panels and panels with other types of contours.

In order to secure the molding 2 over the clip 10 after the clip has been secured to the panel 6 one of the inturned edges or flanges 4 of the molding is "hooked" under the semiresilient detent 27 so that it abuts the shoulders 24. The molding is then pushed toward the clip 10 and because of the resiliency of the detents 19 the opposite edge or inturned flange 4 of the molding slides over the cam-like portion 32 on the resilient detents 19. Once the opposite inturned flange 4 passes the apex or peak of the cam-like portion 32 it in a sense passes "over-center" into the angle 33 formed by the pair of detents 19 and the shoulder 20 which appears as a V-shaped groove or trough in Fig. 1. It will be observed then that both edges of the inturned flanges 4 of the molding 2 extend into the apexes of the angles 33, 39 formed by the detents 19, 27 and shoulders 20, 24, respectively. It should be emphasized that the angles 33, 39 formed between the detents 19 and 27 and the shoulders 20 and 24, respectively, diverge in the same general direction in which the tabs and shoulders forming the angles 33, 39 extend.

With the foregoing construction the detents 19, 27 exert a constant pressure against the edges or flanges 4 of the molding thereby constantly forcing it against the body panel 6 so that a completely rattle-free connection is provided between the molding and the panel while the shoulders 20 and 24 prevent any transverse movement of the molding relative to the panel.

I claim:

A spring clip device for securing a trim member having an opening in one face with inturned flanges therealong to an apertured support comprising a single piece of flat spring metal having projections extending in one direction therefrom adapted to be received through an aperture in the support, said projections being adapted to engage an inner face of the support when the clip is installed and said projections are spread, said clip having shoulders extending generally in the opposite direction at the ends thereof which are rigid and adapted to lie between and for snug engagement with opposite edges respectively of the inturned flanges of the trim member for constraining the trim member from relative rotation and relative lateral movement substantially in the general plane of the trim member, said clip having resilient detents extending generally in said opposite direction at the sides thereof intermediate said shoulders and also adapted to lie between and for snug engagement with the edges respectively of the inturned flanges of the trim member for resiliently constraining the trim member from movement normal to the general plane of the trim member away from the clip, each of said detents forming with an associated adjacent shoulder an angular trough in which an edge of the trim member is adapted to fit, said projections extending from the plane of the clip intermediate the ends and sides thereof.

References Cited in the file of this patent

UNITED STATES PATENTS

| | | |
|---|---|---|
| 2,201,335 | Cotter | May 21, 1940 |
| 2,476,207 | Brown | July 12, 1949 |
| 2,579,279 | Tinnerman | Dec. 18, 1951 |
| 2,585,996 | Brown | Feb. 19, 1952 |
| 2,612,245 | Poupitch | Sept. 30, 1952 |
| 2,644,213 | Bedford | July 7, 1953 |
| 2,653,687 | Churchill | Sept. 29, 1953 |
| 2,682,693 | Poupitch | July 6, 1954 |

UNITED STATES PATENT OFFICE

CERTIFICATE OF CORRECTION

Patent No. 2,875,493                         March 3, 1959

Engelbert A. Meyer

It is hereby certified that error appears in the printed specification of the above numbered patent requiring correction and that the said Letters Patent should read as corrected below.

Column 4, line 12, for "opposite" read — the —.

Signed and sealed this 11th day of August 1959.

(SEAL)

Attest:

KARL H. AXLINE
Attesting Officer

ROBERT C. WATSON
Commissioner of Patents